March 29, 1960
H. E. SCHRADER
2,930,477
CONVEYOR
Filed July 2, 1957
8 Sheets-Sheet 1
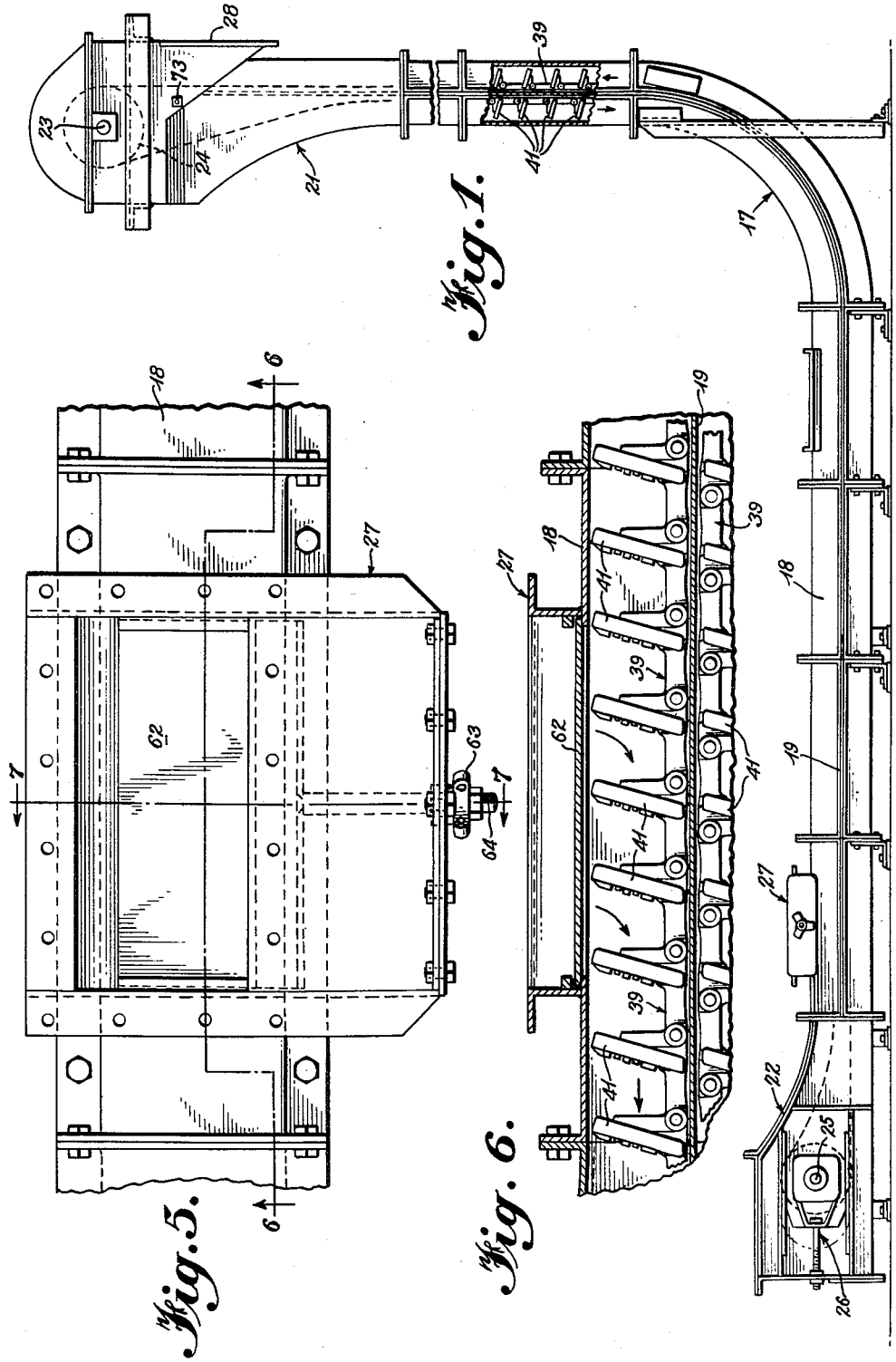

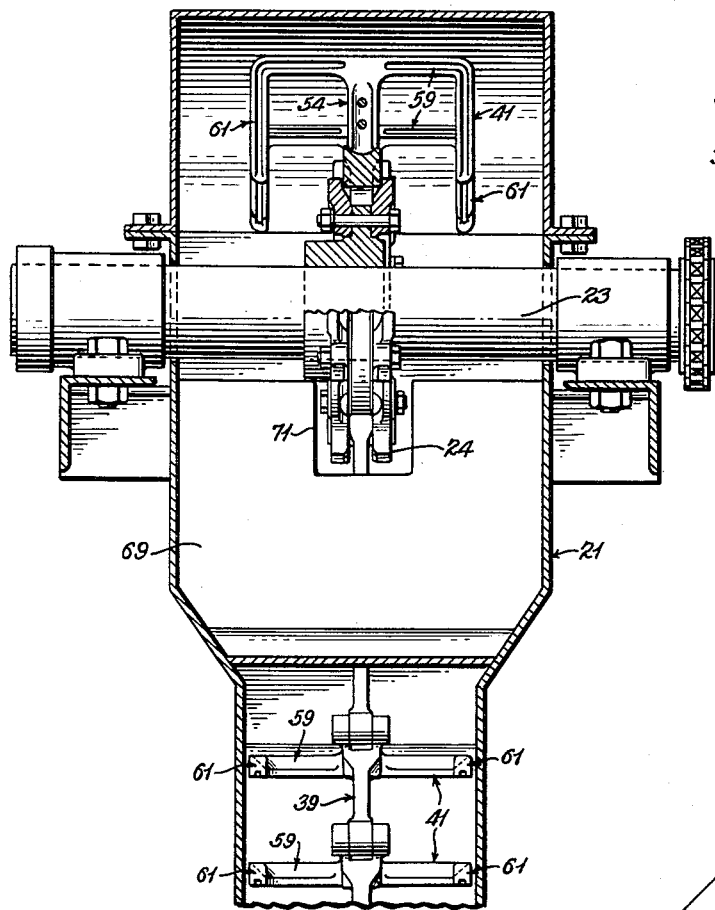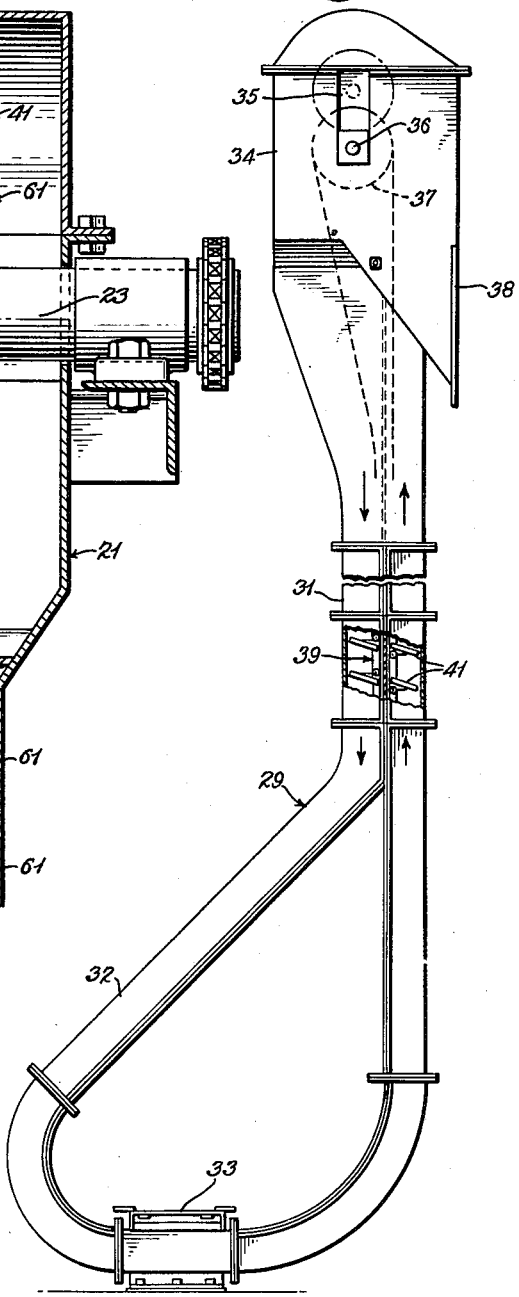

March 29, 1960  H. E. SCHRADER  2,930,477
CONVEYOR
Filed July 2, 1957  8 Sheets-Sheet 3

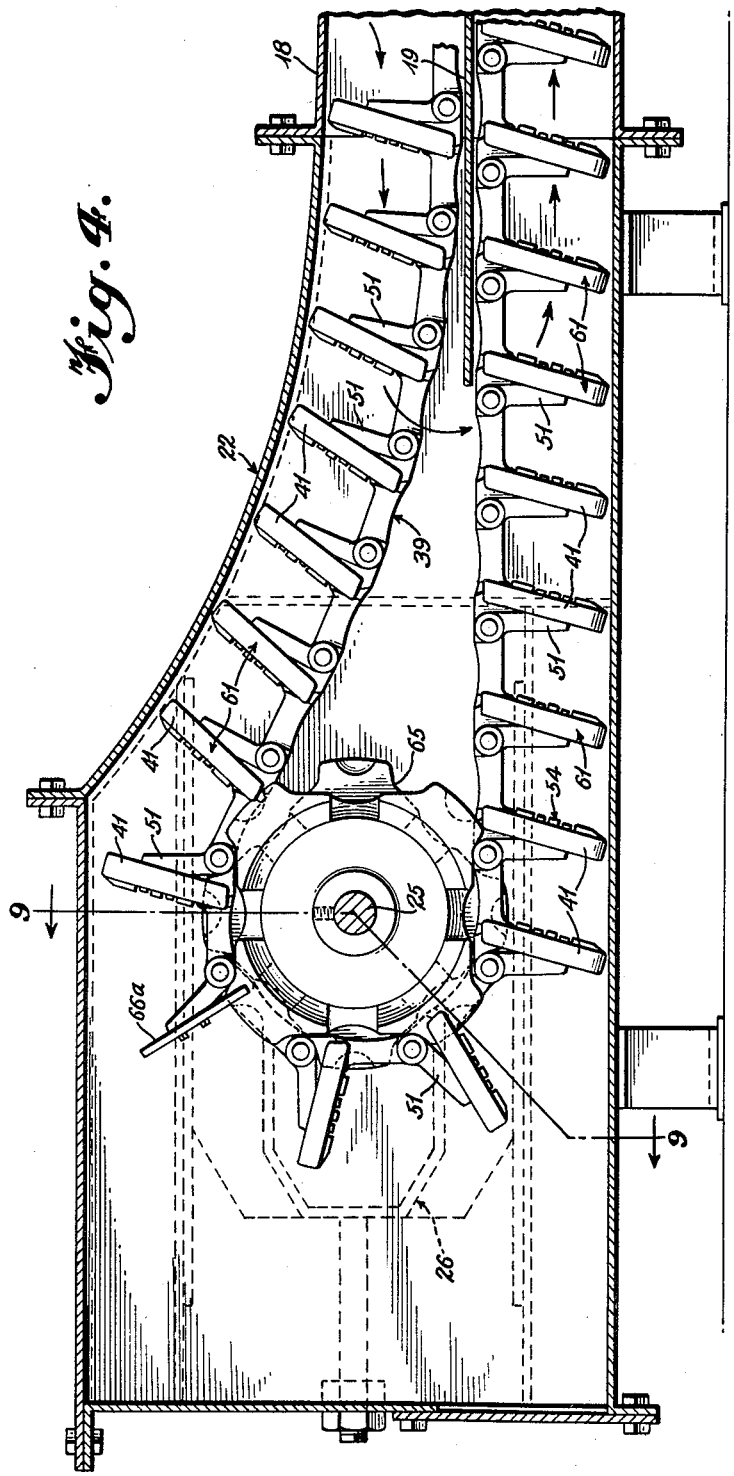

March 29, 1960 H. E. SCHRADER 2,930,477
CONVEYOR

Filed July 2, 1957 8 Sheets-Sheet 5

March 29, 1960 H. E. SCHRADER 2,930,477
CONVEYOR
Filed July 2, 1957 8 Sheets-Sheet 6
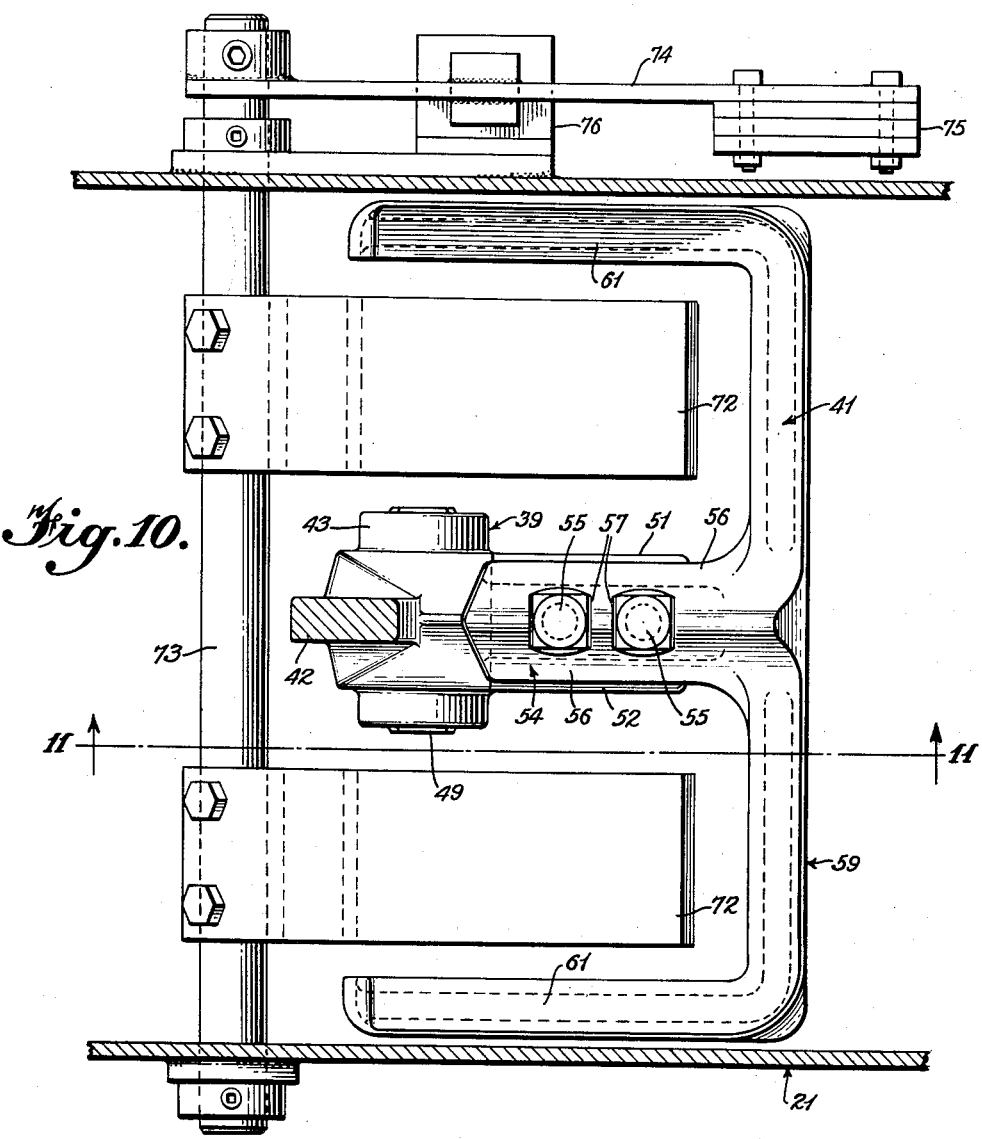
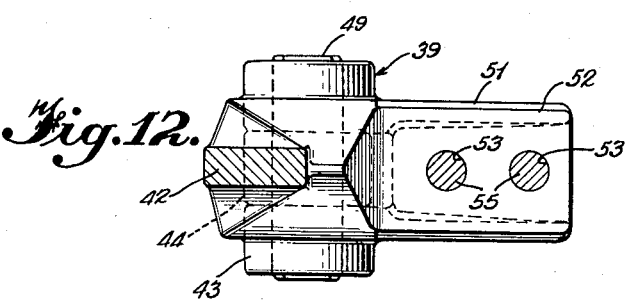

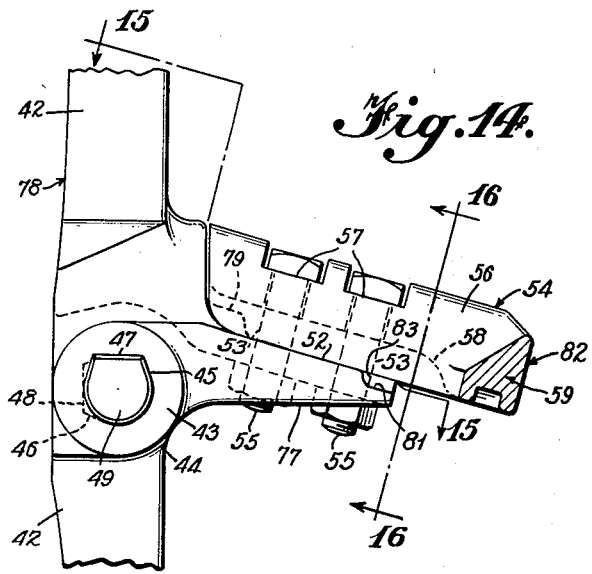
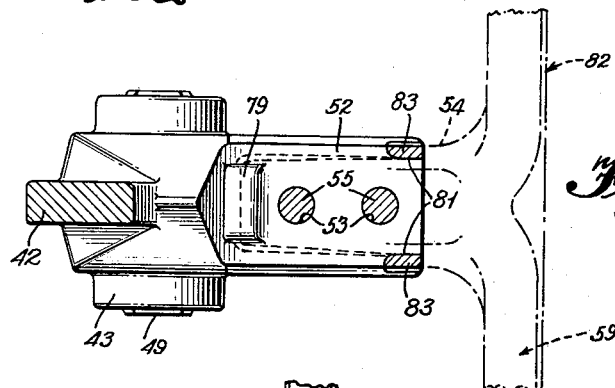
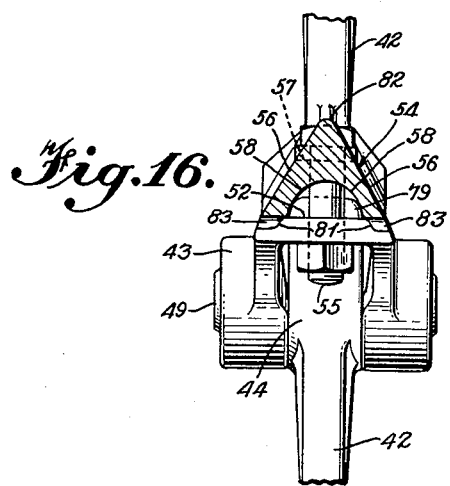

United States Patent Office 2,930,477
Patented Mar. 29, 1960

2,930,477

CONVEYOR

Herbert E. Schrader, Elgin, Ill., assignor to Link-Belt Company, a corporation of Illinois Application July 2, 1957, Serial No. 669,613

4 Claims. (Cl. 198—168)

This invention relates to new and useful improvements in conveyors and deals more particularly with such equipment in which a series of skeleton or open flights on an endless traction member operate within a substantially closed casing for conveying bulk material through vertical, horizontal or combined vertical and horizontal paths.

The use of skeleton flights in connection with such conveyors is well known and has given satisfactory results in the past. Known types of skeleton flights, however, generally have been of U shape and have been connected to a traction member at the center of the bottom of the U with the arms of each flight directed inwardly relative to the closed path followed by the traction member. With this type of skeleton flight, special provisions were required when it was desired to employ solid cleanout flights at spaced points along the traction member when necessary to effect complete removal of material from the casing. For example, the spaced solid flights have been hinged to the traction member to permit movement of the flights around the sprockets at the head and tail sections of the conveyor, or the sprockets have been notched to receive the solid flights moving therearound.

A further difficulty often encountered in connection with the use of prior U-shaped flights was the necessity of feeding material into or out of the casing through the path of movement of the traction member. When such a necessity occurs, the traction member impedes the movement of the material.

The above described mounting of the U-shaped skeleton flights has also accelerated the wear of the flights and the casing in those sections of the conveyor where the flights were moved with the ends of their arms in engagement with a horizontally arranged casing wall or with the outside of a curved wall of the casing.

It is the primary object of this invention to provide a flight type conveyor for moving bulk material in a continuous stream through a substantially closed casing with the conveyor being adapted to employ both skeleton and solid flights which are readily interchangeable.

A further important object of the invention is to provide a skeleton flight type of conveyor operating in a substantially closed casing and including a traction member connected to the flights in such a manner as to permit the introduction of material to and the discharge of material from the spaces between the flights without interference from the traction member.

Still another important object of the invention is to provide a conveyor having a series of double U-shaped flights connected to a traction member for movement through a substantially closed casing with either the traction member or the closed bottoms of the flights engaging the underlying walls of any horizontally arranged leg portions that may be provided in the casing path.

Other objects and advantages of the invention will be apparent during the course of the following description.

In the accompanying drawings, forming a part of this specification and in which like reference characters are employed to designate like parts throughout the same, Figure 1 is a side elevational view of an L-type conveyor-elevator embodying the invention, Figure 2 is a side elevational view of a loop-boot elevator embodying the invention, Figure 3 is a vertical sectional view of the head section of the conveyor-elevator illustrated in Fig. 1, Figure 4 is a vertical sectional view of the tail section of the conveyor-elevator illustrated in Fig. 1, Figure 5 is a top plan view of the feed gate for the conveyor-elevator of Fig. 1, Figure 6 is a fragmentary vertical sectional view taken on line 6—6 of Fig. 5, Figure 7 is a vertical sectional view taken on line 7—7 of Fig. 5, Figure 8 is a vertical sectional view taken on line 8—8 of Fig. 3, Figure 9 is a transverse sectional view taken on line 9—9 of Fig. 4, Figure 10 is an enlarged, fragmentary sectional view taken on line 10—10 of Fig. 3, Figure 11 is a vertical sectional view taken on line 11—11 of Fig. 10, Figure 12 is a fragmentary sectional view taken on line 12—12 of Fig. 11, Figure 13 is a fragmentary front elevational view of a conveyor flight passing the hinged stripper plates of Fig. 11, Figure 14 is a vertical sectional view similar to Fig. 11 but showing a modified conveyor flight.

Figure 15 is a fragmentary sectional view taken on line 15—15 of Fig. 14, and

Figure 16 is a fragmentary, transverse sectional view taken on line 16—16 of Fig. 14.

Figure 3:
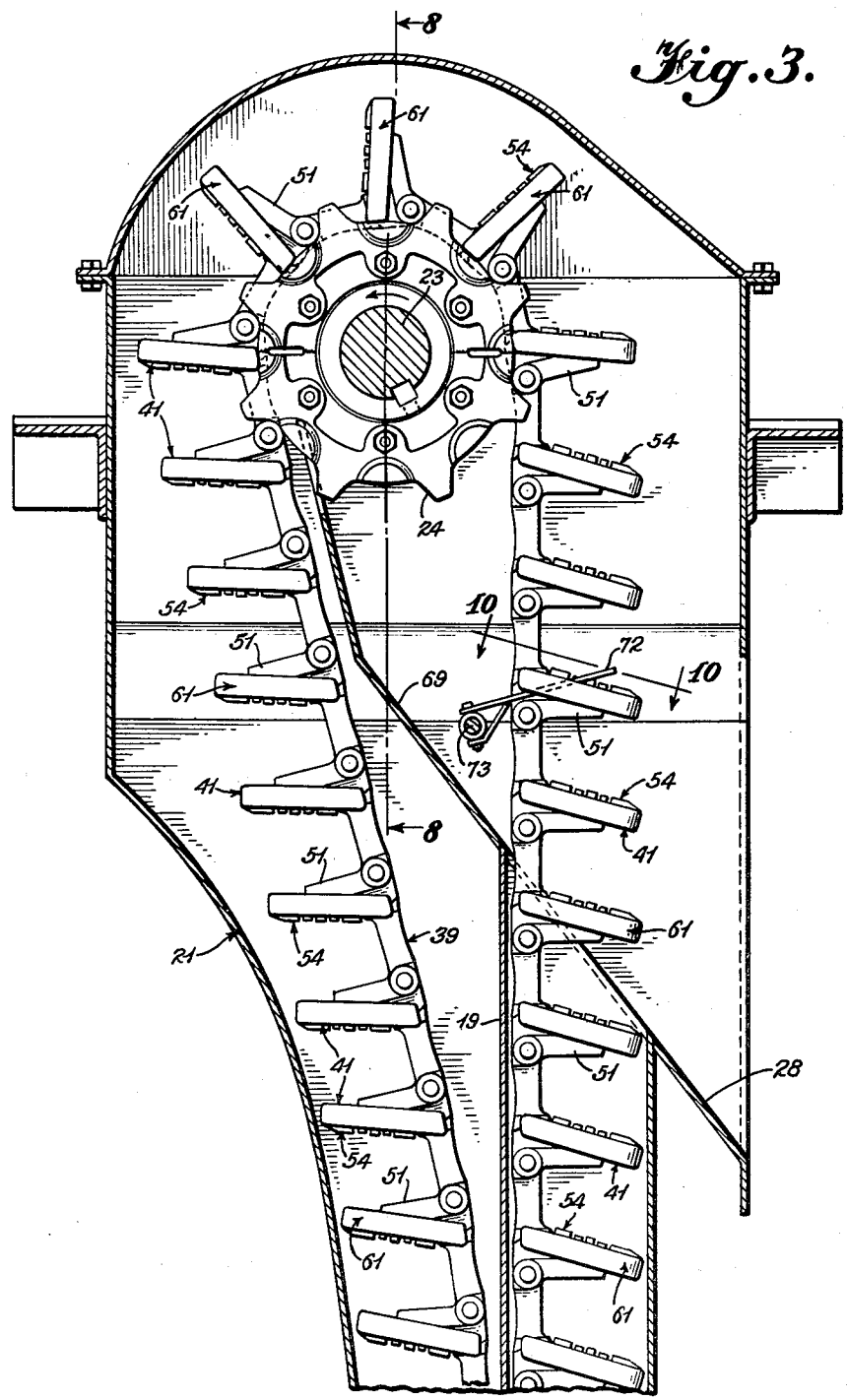

In the drawings, wherein for the purpose of illustration are shown the preferred embodiments of the invention, and first particularly referring to Fig. 1, there is shown an L-type conveyor-elevator designated in its entirety by the reference character 17. The carrying and return runs of the conveyor 17 are combined within a single casing 18 that is divided into two U-shaped troughs by a longitudinally extending partition plate 19 which serves as a closure member for each of the troughs and which is continuous throughout the length of the conveyor 17 between the head section 21 and the tail section 22. The head section 21 is of the front discharge type with a fixed head shaft 23 supporting the head sprocket 24 in a stationary position. The tail shaft 25, however, is mounted in the tail section 22 by means of screw adjusted take-up units 26 at each side of the tail section 22. Material is fed into the casing 18 through a feed gate 27 that is mounted on the top of the casing adjacent the tail section 22 and material is discharged from the head section 21 through the front opening discharge spout 28.

Illustrated in Fig. 2 is loop-boot elevator 29 having the lower portion of its casing 31 in the form of a loop 32 into which material is fed through a gate 33. At the upper end of the conveyor 29 there is provided a front discharge head section 34 with screw adjusted shaft take-up units 35 at opposite sides thereof for supporting the head shaft 36 and the associated head sprocket 37. The head section 34 is also provided with a discharge spout 38 through which material is discharged. It will be noted that no tail shaft is necessary in the elevator illustrated in Fig. 2 since the loop portion 32 of the elevator casing guides the conveying flights between the carrying and return runs.

Figure 13:
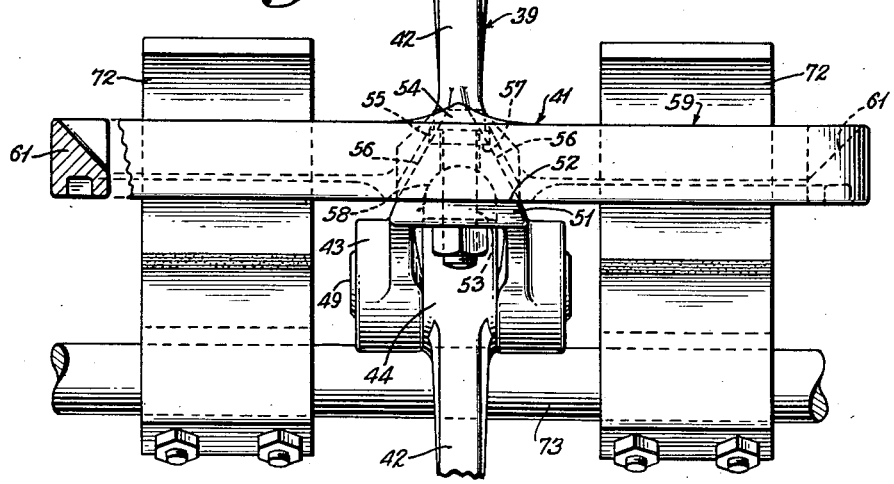

Both the combined conveyor-elevator 17 and the loop-boot elevator 29 employ an endless traction member, or chain, 39 having a plurality of flights 41 mounted thereon for moving material through the casing legs for their carrying runs. Referring now to Figs. 10 to 13, inclusive, for a detail description of the traction member, or chain, 39 and flights 41 illustrated therein, it will be seen that the chain is formed of a plurality of pivotally connected links 42. As illustrated in Fig. 13, each of the links 42 has a forked end portion 43 for receiving the tongue 44 at the leading end portion of the next succeeding link of the chain 39.

Figure 11:
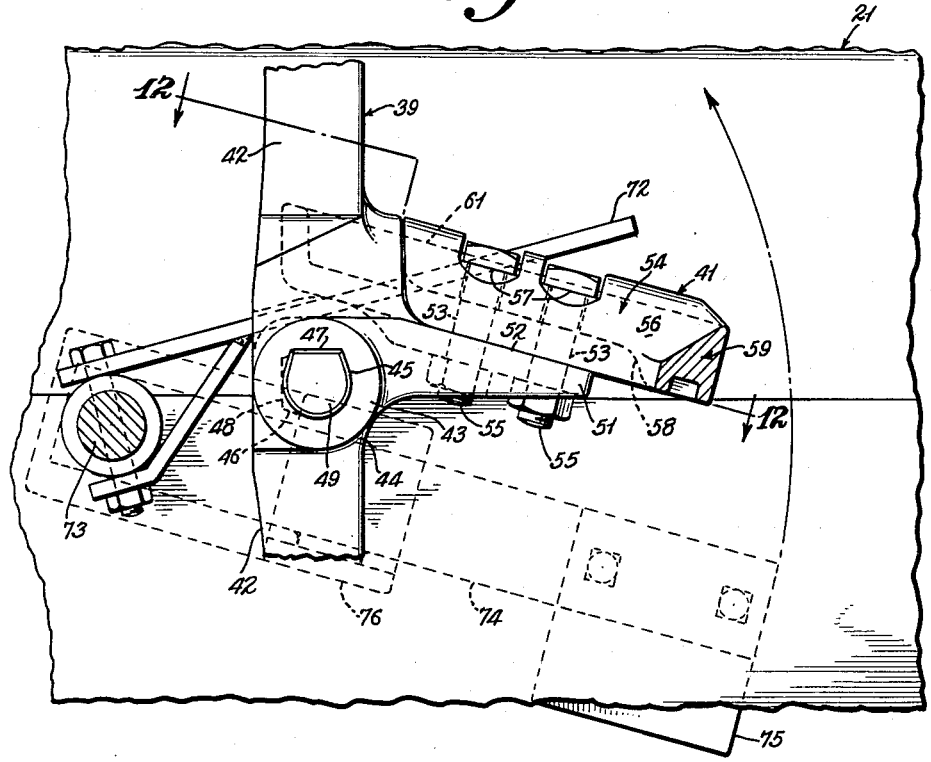

By reference to Fig. 11, it will be seen that the pivotally connected forked and tongue end portions 43 and 44 of adjacent links 42 have formed therein pitch holes 45 and 46, respectively, which are provided with flats 47 and 48. The flats 47 and 48 of the aligned pitch holes 45 and 46 are displaced from each other through an angle of 90° when the pitch lines of adjacent links 42 are aligned. Relative pivotal movement of two adjacent links 42 through an angle of 90°, therefore, will position the flats 47 and 48 in alignment so that a pin 49 having an enlarged, flattened middle portion may be inserted into the aligned pitch holes 45 and 46 to pivotally connect the two links. Subsequent movement of the two links 42 out of the 90° relationship will misalign the flats 47 and 48 of the pitch holes 45 and 46, respectively, so that the flattened middle portion of the pin 49 will prevent accidental displacement of the pin axially of the pitch holes.

As is best illustrated in Fig. 11, the forked end portion 43 of each link 42 is provided with a mounting lug 51 which extends outwardly from one face of the chain 39. A flat mounting surface 52 is formed on the leading side of each mounting lug 51 and in a plane which extends outwardly and rearwardly relative to the intended direction of movement of the chain 39. By reference to Fig. 12 it will be seen that two holes 53 are drilled through the mounting lug 51 in normal relationship with the mounting surface 52.

Mounted on at least a major portion of the lugs 51 of the links 42 are U-shaped skeleton flights 41 as illustrated in Fig. 10. By reference to this figure, it will be seen that each flight 41 has a mounting, or middle arm 54 that is clamped into seated relationship against the surface 52 of its associated mounting lug 51 by bolts 55 which pass through the mounting arm and through the holes 53 of the lug. As illustrated in Figs. 11 and 13, the top of the arm 54 is formed with surfaces 56 which converge inwardly from the sides of the arm to form an inverted V-shape or ridge that is notched to provide flats 57 against which the heads of the bolts 55 are seated. It will also be noted that the arm 54 is provided with a longitudinally arranged recess 58 in the underside thereof to insure proper seating of the side portions of the arm on the mounting surface 52. The inverted V-shape or ridge formed by the converging surfaces 56 will shed material and thereby prevent its carry-over and recirculation.

At the outer end of the mounting arm 54 there is provided a U-shaped portion which in the present instance includes a crossbar 59 and two arms 61. The crossbar 59 extends laterally in opposite directions from and in normal relationship with the arm 54. At opposite ends of the crossbar 59 and in equally spaced relationship from the mounting arm 54, the two arms 61 extend from the crossbar 59 in substantially parallel relationship with the mounting arm. The lengths of the arms 61, however, are slightly greater than that of the mounting arm 54 so that the free ends of the arms 61 lie in closely spaced relationship with a plane through the back of the chain 39. It will also be noted by reference to Figs. 7 and 9 that the outwardly facing surface of the U-shaped portion of each flight 41 corresponds to the inner surface of the U-shaped trough portion of the casing 18. Furthermore, the mounting arm 54 is of such a length as to position the U-shaped portion in closely contiguous relationship with the U-shaped trough and the traction member in closely contiguous relationship with the closure member or partition plate 19 so that the flights and the traction member will be guided through the casing by the U-shaped trough and the partition plate, respectively.

Referring once again to Figs. 1 and 2, it will be seen that movement of the chain 39 through the casing 18 of the conveyor-elevator 17 or the casing 31 of the loop-boot elevator 29 will cause the flights 41 and chain 39 to function as a skeleton-like reinforcement or frame to move the material through the casing. The material conveying operation of the flights 41 will be described in connection with the combined conveyor-elevator 17 illustrated in Fig. 1. It is to be understood, however, that the conveying operation performed by the flights 41 in this structure will be identically duplicated by the flights 41 of the loop-boot elevator illustrated in Fig. 2 and in any other arrangement of casing, feed gate and discharge spout which will provide for movement of the chain 39 through a closed path including a carrying run from the feed gate to a discharge spout.

Figure 7:
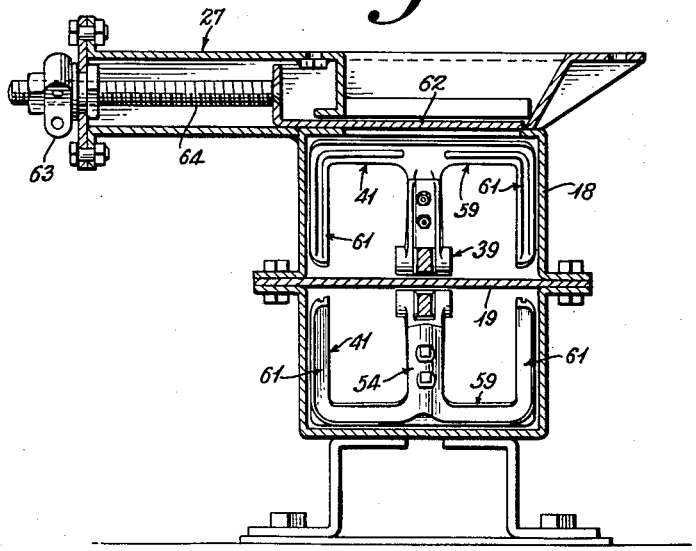

As illustrated in Figs. 5, 6 and 7, material is continually fed into the upper portion of the casing 18 at a point adjacent the tail section 22 through the feed gate 27. Of course, the gate 27 would be located at the bottom of a feed chute or hopper, not shown, from which material would be free to flow at a rate that would vary in accordance with the position of the closure member 62 of the gate. In other words, when the closure member 62 is in its closed position, as illustrated, no material will be permitted to flow into the casing 18. Rotation of the nut 63, however, will cause the screw 64 to advance the closure member 62 laterally outwardly away from its closed position so that material will flow into the casing 18 and will accumulate on the partition plate 19 for movement by the flights 41 toward the tail section 22. By reference to Fig. 7, it will be readily apparent that movement of the closure member 62 to its fully open position will permit material to flow into the casing 18 at a rate at which the material will completely surround the flights 41 moving past the opening so that a solid stream of material will move from the gate 27 to the tail section 22.

As illustrated in Fig. 4, the partition plate 19 terminates in spaced relationship with the sprocket 65 which is mounted on the shaft 25 in the tail section 22. The material moving from the gate 27 toward the tail section 22, therefore, will drop into the bottom portion of the tail section as it is moved out of its overlying relationship with the partition plate 19. In the bottom portion of the tail section 22, however, the material will once again be engaged by the flights 41 that have passed around the tail sprocket 65 and will be moved by these flights into the portion of the carrying leg of the casing 18 which lies beneath the partition plate.

Figure 9:
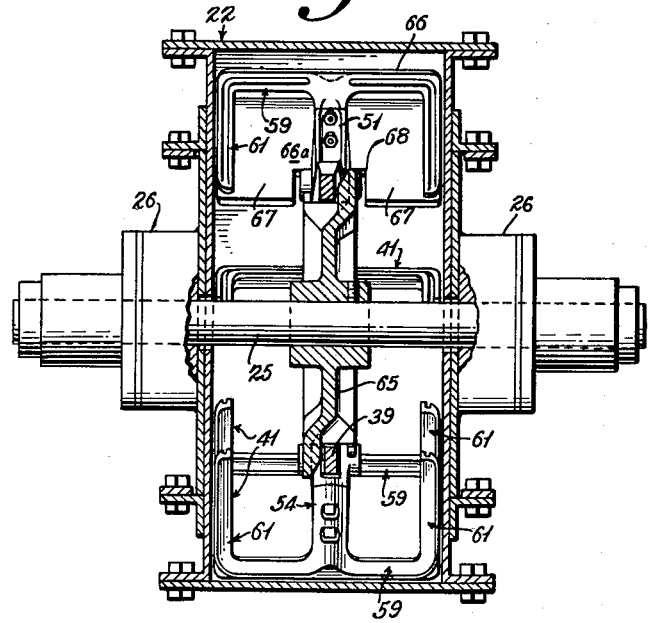

As is best illustrated in Fig. 9, if desired, one or more cleanout flights 66 may be mounted on the chain 39 in place of the regular flights 41. These flights 66 provide solid webs 67 which may be cast with the body of the flight. The web 67 extends between the side portions of the crossbar 59 and the arms 61 of the flight into closely spaced relationship with the mounting arm 54 of the link and the lug 51 of the chain 39. The inner edge portion of the web 67 is notched at 68 to provide clearance with the chain 39 for movement around the tail sprocket 65 and head sprocket 24. As an alternate structure, a flat steel plate 66a, properly notched to accommodate the chain and sprocket, may be substituted for a conventional flight where desired, see Fig. 4. These flights 66 form a substantially solid barrier across the casing 18 so that the material in the casing will be removed if its supply is stopped and the solid flight continues to move.

Considering now the manner in which the material is moved through the horizontal and vertical portions of the carrying leg of the casing between the tail section 22, where the material is fed, and the head section 21, where the material is discharged through the spout 28, it will be readily apparent that a free flow of material into the feed gate 27 will fill the spaces between and around the flights 41 moving beneath the feed gate and that spillage of this material into the bottom portion of the tail section 22 at the end of the partition plate 19 will similarly fill the spaces between and around the flights 41 moving away from the tail sprocket 65 into the space between the partition plate and the bottom of the casing 18. By reference to Fig. 7, it will be seen that the crossbar 59 and arms 61 of each of the skeleton flights 41 are of such a size and are so mounted on the chain 39 as to cause the crossbar to extend across the bottom of the casing 18 and the arms to extend upwardly along the opposite sides of the casing 18 into spaced relationship with the partition plate 19 when the chain is moved through its path immediately adjacent and beneath the partition plate.

Referring now to Figs. 3 and 8 for a detail description of the head section 21, and first particularly referring to Fig. 3, it will be seen that the partition plate 19 extends into the head section and is connected to a spill plate 69 which is inclined relative to the vertical path of movement of the chain 39 through its carrying leg. The partition plate 19, the opposite wall of the head section 21 and the two sides of the head section form the four sides of an opening in the spill plate 69 through which the chain 39 rises and the lower portion of the spill plate forms the lip of the discharge spout 28. As best illustrated in Fig. 8, the upper marginal portion of the spill plate 69 is provided with a notch 71 for clearance with the head sprocket 24.

It will be readily apparent that movement of the material into the enlarged space above the spill plate 69 will cause the material to spill outwardly from the spaces between the adjacent flights 41 and onto the spill plate for gravitational flow through the discharge spout 28. Further any material which clings to the flights 41 will be dislodged therefrom by the stripper plates 72 that are mounted on the shaft 73 which extends between and is pivotally supported on the opposite side walls of the head section 21. As illustrated in Figs. 10 and 11, one end portion of the shaft 73 outside the head section 71 has rigidly connected thereto an arm 74 with a weight 75 mounted on its outer end portion. As illustrated in Fig. 11, the angular relationship between the stripper plates 72 and the arm 74 is such that when the stripper plates 72 extend outwardly and upwardly from the shaft 73, the arm 74 extends outwardly and downwardly from the shaft and is supported by a bracket 76. Engagement of the stripper plates 72 with material still clinging to the flights 41, or by the webs 67 of a solid flight 66, will cause the stripper plates to partake of pivotal movement with the shaft 73 and will swing the arm 74 upwardly from its position at rest on the bracket 76. When the stripper plates 72 are freed by the passage of a flight, however, the weight 75 will cause the arm 74 to return to its position at rest on the bracket 76 and will return the stripper plates to their normal positions.

From the discharge spout 28, the chain 39 moves upwardly and over the head sprocket 24 and downwardly therefrom and through the return leg of the casing 18 to the feed gate 27. It will be noted that the outwardly and rearwardly inclined arrangement of the flights 41 relative to the direction of movement of the chain 39 will prevent any undue vibration or chattering of the flights when they are engaged by the casing 18 to guide the movement of the chain. Further, any engagement between the outer edges of the flights 41 and the casing 18 will be spread uniformly across the width of the crossbars 59 of the various flights so as to provide a relatively large area of contact and thereby decrease the wear on the flights.

Referring now to Figs. 14 to 16, inclusive, for a detail description of the modification of the invention illustrated therein, it will be seen that the mounting lug 77 and the chain 78 are identical to the mounting lug 51 and the chain 39 except for the provision of a flight keying projection 79 and two keyways 81. The remaining portions of the chain 78 and mounting lug 77, therefore, have been given the same reference characters as the corresponding parts of the chain 39 and lug 51. It will be noted that the keying projection 79 is formed to extend upwardly from the mounting surface 52 at the end portion thereof adjacent the forked end portion 43 of the chain link 42. It will also be noted that the two keyways 81 are formed in the opposite sides of the lug 77 and at the outer end thereof.

A flight 82 is mounted on the lug 77 and is identical to the previously described flights 41 except for the provision of keying lugs 83 which are shaped to enter and conform with the keyways 81 of the lug 77. The remaining portions of the flight 82 have been given the same reference characters as the corresponding portions of the flights 41.

By reference to Fig. 16 it will be readily apparent that the keying projection 79 enters the recess 58 in the underside of the mounting arm 54 and that the keying lugs 83 enter into the keyways 81 to accurately position the mounting arm 54 on the mounting lug 77 and to prevent slippage of the flight 82 on the mounting surface 52 when the bolts 55 are tightened to secure the flight to the mounting lug. It will also be noted that the absence of any interfering projections from the mounting surface 52 outwardly of the keying projection 79 will permit the mounting of any flight 82 on the mounting lug 77 which flight is provided with a flattened surface area at its point of engagement with the mounting surface 52.

It is to be understood that the forms of this invention herewith shown and described are to be taken as the preferred examples of the same, and that various changes in the shape, size, and arrangement of parts may be resorted to without departing from the spirit of the invention or the scope of the subjoined claims.

Having thus described the invention, I claim:

1. Apparatus for conveying material through a substantially closed casing, comprising an endless chain formed of a plurality of pivotally connected links arranged for movement through said casing in closely spaced relationship with one wall thereof, at least some of said links each having a mounting lug projecting outwardly from one face thereof in a direction away from said one wall and adjacent one of the pivot connections of the link, and a flight attached to each of said mounting lugs, said flight including a mounting arm rigidly connected to the corresponding mounting lug, a crossbar at the outer end of said mounting arm arranged in closely spaced relationship with the opposite wall of said casing and extending in opposite directions from said mounting arm transversely of said chain, and a pair of arms positioned in substantially parallel relationship with said mounting arm extending inwardly from the opposite end portions of said crossbar and terminating in a common plane paralleling the adjacent pivot axis of its link with said plane being located between said pivot axis and the adjacent wall-engaging face of said link.

2. Apparatus as defined in claim 1 further characterized by said mounting lugs each having a flat mounting surface facing forwardly and outwardly in the direction of movement of the chain, and said mounting arms each having one side thereof clamped against the mounting surface of its associated mounting lug to support the crossbar and the pair of arms extending inwardly therefrom in a plane that is inclined rearwardly and outwardly from said chain.

3. Apparatus as defined in claim 2 further characterized by said mounting lugs each having a plurality of irregularly formed surface areas adjacent said flat mounting surface, and said mounting arms each having surface areas that are complementary to said irregularly formed surface areas for engaging the latter to position said mounting arms for connection with their corresponding mounting lugs.

4. Apparatus for conveying material through a substantially closed casing, comprising an endless chain formed of a plurality of pivotally connected links arranged for movement through said casing in closely spaced relationship with one wall thereof, at least some of said links each having a mounting lug formed integral with its trailing pivoted end and projecting outwardly from one face thereof in a direction away from said one wall, and a flight connected to each of said mounting lugs and arranged to be inclined rearwardly relative to the direction of movement of the chain, each of said flights including a mounting arm detachably connected to its mounting lug and having its forwardly facing surface inclined transversely to shed material therefrom, a crossbar integral with the outer end of said mounting arm arranged in closely spaced relationship with the opposite wall of said casing and extending in opposite directions from said mounting arm transversely of said chain, and an arm integral with each one of the outer end portions of the crossbar with the last mentioned arms being arranged to extend toward said one casing wall but with their free ends terminating in a somewhat greater spaced relationship to said one casing wall than the spaced relationship between said one casing wall and the wall engaging face of said chain.

References Cited in the file of this patent

UNITED STATES PATENTS

| | | |
|---|---|---|
| 1,559,060 | Alleman | Oct. 27, 1925 |
| 1,970,289 | Elmer | Aug. 14, 1934 |
| 1,995,589 | De L. Sinden | Mar. 26, 1935 |
| 2,066,866 | White | Jan. 5, 1937 |
| 2,226,989 | Young | Dec. 31, 1940 |
| 2,756,868 | Russell | July 31, 1956 |
| 2,767,825 | Welch | Oct. 23, 1956 |
| 2,822,915 | Hampton | Feb. 11, 1958 |

FOREIGN PATENTS

| | | |
|---|---|---|
| 117,087 | Switzerland | Aug. 1, 1935 |